United States Patent
Tipton et al.

(10) Patent No.: US 8,096,780 B2
(45) Date of Patent: Jan. 17, 2012

(54) SINGLE PIECE DUAL JET PUMP AND FUEL SYSTEM USING IT

(75) Inventors: Larry Tipton, Sterling Heights, MI (US); Paul Daniel Reuther, Oxford, MI (US)

(73) Assignee: Inergy Automotive Systems Research (S.A.), Brussels (BE)

( * ) Notice: Subject to any disclaimer, the term of this patent is extended or adjusted under 35 U.S.C. 154(b) by 349 days.

(21) Appl. No.: 12/440,047

(22) PCT Filed: Sep. 12, 2007

(86) PCT No.: PCT/EP2007/059552
§ 371 (c)(1),
(2), (4) Date: Mar. 5, 2009

(87) PCT Pub. No.: WO2008/031833
PCT Pub. Date: Mar. 20, 2008

(65) Prior Publication Data
US 2010/0037866 A1    Feb. 18, 2010

Related U.S. Application Data

(60) Provisional application No. 60/844,664, filed on Sep. 15, 2006.

(30) Foreign Application Priority Data

Sep. 29, 2006 (EP) ..................... 06121532

(51) Int. Cl.
*F04F 5/00* (2006.01)
*F04F 5/48* (2006.01)

(52) U.S. Cl. .......... 417/151; 417/179; 123/509
(58) Field of Classification Search .......... 123/509–514; 417/151, 194, 198, 165–170, 179
See application file for complete search history.

(56) References Cited

U.S. PATENT DOCUMENTS

| 4,503,885 | A | * | 3/1985 | Hall ............... | 137/574 |
| 4,834,132 | A | * | 5/1989 | Sasaki et al. ...... | 137/143 |
| 5,133,324 | A | * | 7/1992 | Michiaki ......... | 123/514 |
| 5,396,872 | A | * | 3/1995 | Ruger et al. ...... | 123/514 |

(Continued)

FOREIGN PATENT DOCUMENTS

EP    1300582 A2    4/2003

(Continued)

OTHER PUBLICATIONS

PCT International Search Report dated Jan. 1, 2008 for International Application No. PCT/EP2007/059552 (3 pg.).

(Continued)

*Primary Examiner* — Thomas Moulis
(74) *Attorney, Agent, or Firm* — Oblon, Spivak, McClelland, Maier & Neustadt, L.L.P.

(57) ABSTRACT

Single piece dual jet pump comprising at least one pressurized fluid inlet orifice and 2 separate outlet orifices which are built has two separate jet pumps. Fuel system for an internal combustion engine including a fuel tank, a reservoir within said tank, a pump for supplying the engine with fuel drawn from the reservoir and such a single piece dual jet pump designed to allow the filling of the reservoir with fuel from at least two different locations in said tank outside the reservoir.

19 Claims, 2 Drawing Sheets

U.S. PATENT DOCUMENTS

Figure 1:
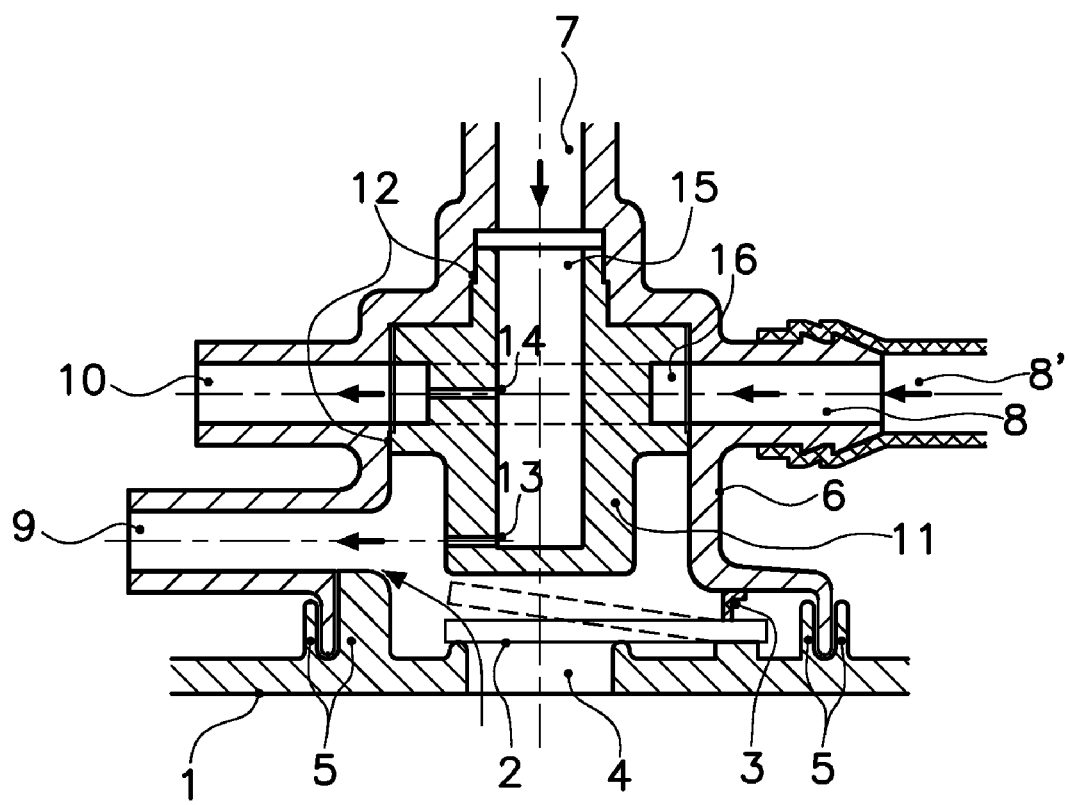

| | | | |
|---|---|---|---|
| 5,564,397 A * | 10/1996 | Kleppner et al. | 123/514 |
| 6,123,511 A * | 9/2000 | Sertier | 417/87 |
| 6,230,691 B1 * | 5/2001 | Coha et al. | 123/514 |
| 6,296,454 B1 * | 10/2001 | Schmid et al. | 417/151 |
| 6,505,644 B2 * | 1/2003 | Coha et al. | 137/565.22 |
| 6,783,329 B2 * | 8/2004 | Vilela et al. | 417/189 |
| 7,080,632 B2 * | 7/2006 | Kleppner et al. | 123/509 |
| 7,124,739 B2 * | 10/2006 | Endoh et al. | 123/457 |
| 7,287,546 B2 * | 10/2007 | Konishi | 137/540 |
| 7,303,378 B2 * | 12/2007 | Kleppner et al. | 417/87 |
| 7,757,671 B2 * | 7/2010 | Danjo et al. | 123/509 |
| 2002/0083929 A1 | 7/2002 | Koller et al. | |
| 2002/0083983 A1 | 7/2002 | Coha et al. | |
| 2003/0062031 A1 | 4/2003 | Tanimura | |
| 2003/0226548 A1 * | 12/2003 | Herzog et al. | 123/514 |
| 2004/0177886 A1 | 9/2004 | Nagata et al. | |
| 2005/0129527 A1 * | 6/2005 | Kimisawa et al. | 417/151 |
| 2005/0175488 A1 * | 8/2005 | Schelhas et al. | 417/505 |
| 2010/0202898 A1 * | 8/2010 | Mason et al. | 417/151 |

FOREIGN PATENT DOCUMENTS

| | | |
|---|---|---|
| JP | 2004324611 A | 11/2004 |
| WO | WO 2005021955 A1 | 3/2005 |
| WO | WO 2006097443 A1 | 9/2006 |
| WO | WO 2006097444 A1 | 9/2006 |
| WO | WO 2006097451 A2 | 9/2006 |

OTHER PUBLICATIONS

European Search Report dated Mar. 21, 2007 for European Application No. 06121532 (2 pg.).

* cited by examiner

SINGLE PIECE DUAL JET PUMP AND FUEL SYSTEM USING IT

CROSS-REFERENCE TO RELATED APPLICATIONS

This application is a U.S. national stage application under 35 U.S.C. §371 of International Application No. PCT/EP2007/059552 filed Sep. 12, 2007, which claims priority to U.S. provisional application No. 60/844,664 filed on Sep. 15, 2006, and to European Application No. 06121532.3 filed Sep. 29, 2006, these applications being incorporated herein by reference in their entirety for all purposes.

To date, the fuel delivery modules (FDM) require a substantial reservoir capacity to provide enough reserve fuel for low fuel considerations.

It is namely so that in certain circumstances, for example, when the volume of fuel contained in the fuel tank of an automotive vehicle falls below a certain minimum level and this vehicle travels through a prolonged curve, uphill or downhill, or if it is otherwise subjected to sudden and pronounced changes in speed, direction, etc., the fuel could be displaced to one side of the tank to such an extent that the inlet end of the dip tube, which forms part of the fuel-intake tubing, is at least temporarily no longer submerged in the fuel. Under such conditions, the dip tube sucks out air instead of fuel, thereby producing an interruption in the feed fuel flow that impedes the proper operation of the internal-combustion engine.

In order to avoid such problems, most fuel tanks include a reservoir i.e. a subtank intended to trap fuel and act as a reserve.

The use of a jet pump to fill a fuel reservoir within a fuel tank is a common technology. In the case of saddle tanks, it is even known to use 2 jet pumps to fill the reservoir: one sucking fuel from the main chamber of the fuel tank (where the reservoir is located) into the reservoir, and one for sucking fuel from a secondary chamber into the reservoir. It is even known to use a single piece performing both duties.

For instance, in US 2002/0083983, a single piece integrally molded with the reservoir is used, which is powered by the fuel return and which has two upstanding jet pumps (barrels), one of which serving to suck fuel from both the main and the auxiliary chamber of the tank into the reservoir. Using the same jet member (orifice) for sucking fuel from both chambers is not optimal in terms of fuel entrainment. Additionally, the fact of using the fuel return implies that the flow rate powering the jet pumps is not constant and will cause poor performance during the periods of high engine fuel demand (low fuel return).

JP 2004-324611 also describes a single piece molded dual jet pump for sucking fuel into the reservoir both from an auxiliary and from the main chamber. However, in this piece, both jet orifices are in series, which leaves very little pressure available for the second one (sucking fuel into the main chamber). Besides, again, this piece is powered by a non constant flow (coming from the pressure regulator), which is not optimal in terms of functioning.

The present invention aims at providing a compact, single piece dual jet pump enabling to suck fuel efficiently from 2 different places (chambers) in a tank (hollow body, preferably a fuel tank).

To this end, the present invention concerns a single piece dual jet pump comprising at least one pressurized fluid inlet orifice and 2 separate outlet orifices which are built as 2 separate jet pumps.

The present invention also concerns a fuel system for an internal combustion engine including a fuel tank, a reservoir within said tank and a pump for supplying the engine with fuel drawn from the reservoir, said fuel system comprising a single piece dual jet pump according to claim 1 designed to allow the filling of the reservoir with fuel from at least 2 different locations in said tank outside the reservoir. Preferably, these locations are 2 different chambers in the tank i.e. the tank is a so-called "saddle tank" having at least 2 chambers (or compartments connected by a kind of bridge): one main chamber, where the reservoir and the pump are located, and one auxiliary chamber from which fuel must be drawn.

Generally, the fuel supply pump is located inside the reservoir. In a preferred embodiment, both pump and reservoir constitute a low profile module like the one described in PCT/EP2006/060669, the content of which is incorporated by reference in the present application. In this module, the reservoir by itself has a low profile and the pump is mounted horizontally or inclined into or onto it.

In order for the single piece dual jet pump to be able to draw fuel from the main chamber, one of the jet pump outlet orifices is preferably in the neighborhood of a first fill valve (valve generally present on fuel reservoirs and which aims at filling them when first filling the fuel tank). Such a valve may be of any possible design. A valve which gives good results is the one described in PCT/EP2006/060653, the content of which is incorporated by reference in the present application. This valve is integrally molded and/or assembled with the bottom of the reservoir and comprises:

a disk or flap having at least one hole in it;
a post that fits through the hole in the disk and which is integrally molded or assembled with the reservoir's bottom; and
at least one hole through the reservoir's bottom which is positioned close to the post and in a way such that the disk covers it when positioned in its relief position.

Accordingly, one of the jet pump orifices is preferably located close to the bottom of the reservoir.

In order to be able to draw fuel from the auxiliary chamber, one of the jet pump outlet orifices is preferably in the neighborhood of or connected to a line extending from said chamber and which enters the single piece dual jet pump through a second fluid inlet.

Hence, in a preferred embodiment, the single piece dual jet pump preferably has one jet pump orifice located close to the bottom of the reservoir and the second one, slightly above (higher). This jet pump orifice is generally the one sucking fuel from the auxiliary chamber, while the first one generally is the one sucking fuel from the main chamber through to the first fill valve.

The pressurized fuel entering and powering the dual jet pump is preferably fuel coming directly from the main fuel supply pump, providing a constant pressure (which is not the case with direct fuel return or fuel excess coming from a pressure regulator). Thus, according to a preferred embodiment, the dual jet pump is directly plugged onto or integrated with the pump exit or plugged on or integrated with a line or a piece exiting the pump.

As explained above, the pump is drawing fuel from the reservoir and feeds it to the engine. Accordingly, the pump must also have an exit to the engine. According to a preferred embodiment of the present invention, said exit to the engine is incorporated in a connector linked or integrated to the dual jet pump and which preferably has the shape of a "T". Such a "T" connector is described in PCT/EP2006/060652, the content of which is incorporated by reference in the present application. In a preferred embodiment, the single piece dual jet pump is a piece plugged in (for instance through snap fit connecting areas) the "T" connector. Hence, preferably, the single piece dual jet pump is plugged in a connector having the shape of a "T" which directly connects the fuel supply pump, the fuel filter and the single piece dual jet pump.

In a preferred embodiment, this connector has a first fluid inlet coming from the main fuel supply pump and a second fluid inlet. In the case of a saddle tank, this second inlet is preferably connected by a tube or line to the secondary chamber of the fuel tank. Preferably, this second inlet is located in front and in continuation of the second fluid inlet of the single piece dual jet pump.

Hence, the connector preferably has a first fluid inlet coming from the fuel supply pump located in front of and in continuation with the pressurized fluid inlet orifice of the single piece dual jet pump; and a second fluid inlet orifice located in front of and in continuation with a second fluid inlet of the single piece dual jet pump.

Besides, the connector is preferably open at its bottom so that it can be fixed/plugged over the first fill valve of the reservoir. And most preferably, it also comprises two fluid outlets leading inside the fuel reservoir and being preferably located in front of the jet pump outlet orifices. In the case of a saddle tank with a first fill valve on the reservoir, preferably, one is located in front of the lower jet pump orifice close to the first fill valve and one is located in front of the second, higher located jet pump orifice close to the inlet of fuel from the auxiliary chamber.

The single piece dual jet pump and/or the "T" connector the case being, may be of any material, plastic or metal. Preferably however, they are plastic parts (which are lighter and easier to mold in complicated shapes), which can be molded of--or comprise at least in surface (preferably both on its internal and external surfaces)--a conductive plastic for ESD (Electro-Static Discharge) requirements. The preferred plastic is a polyacetal and most preferably, POM (polyoxymethelene) which is stable in fuels. It can be made conductive by adding conductive charges into it (like carbon black or carbon fibers).

Most preferably, the single piece dual jet pump and/or the "T" connector the case being, are injection molded plastic parts.

The present invention also concerns a connector (preferably with a "T" shape) as described above, integrating (either directly, by molding, or by a mechanical or welding connection) a single piece dual jet pump as described above, suitable to be plugged directly into a fuel pump exit and allowing fuel to be sucked from a fuel tank at 2 different locations to fill a reservoir located inside of it.

More specifically, the present invention concerns a plastic molded connector as described above, suitable for directly connecting a fuel supply pump, a fuel filter and a single piece dual jet pump as described above, said connector being open at its bottom and comprising:
 a first fluid inlet in the form of a mixing tube located in front of and in continuation with the pressurized fluid inlet orifice of the single piece dual jet pump;
 a second fluid inlet built as a mixing tube located in front of and in continuation with a second fluid inlet of the single piece dual jet pump; and
 two fluid outlets also built as mixing tubes and located in front of the jet pump outlet orifices.

More particularly, the present invention concerns a plastic molded connector suitable for directly connecting a fuel supply pump and a fuel filter, said connector integrating a single piece dual jet pump comprising at least one pressurized fluid inlet orifice and 2 separate outlet orifices which are built as 2 separate jet pumps, said connector being open at its bottom and comprising:
 a first fluid inlet mixing tube located in front of and in continuation with the pressurized fluid inlet orifice of the single piece dual jet pump;
 a second fluid inlet mixing tube located in front of and in continuation with a second fluid inlet of the single piece dual jet pump; and
 two fluid outlet mixing tubes being located in front of the jet pump outlet orifices.

Generally, in the dual jet pump and in the connector according to the invention, one outlet orifice is intended to be located close to the bottom of the reservoir and hence, the corresponding jet pump will be easy to start when the system is initiated. Generally, the other one will be located at a higher level. In this case, as proposed by some suppliers, deflectors or small cup-shaped reservoirs could be added to retain a small amount of fuel at the jet orifice to permit the formation of the suction flow when the system is initiated. The suction will not develop without the presence of liquid since the small jet stream cannot generate suction in air. Another preferred way is to angle the corresponding outlet mixing tube upwards thereby forming a small pool area to retain fuel.

Figure 2:
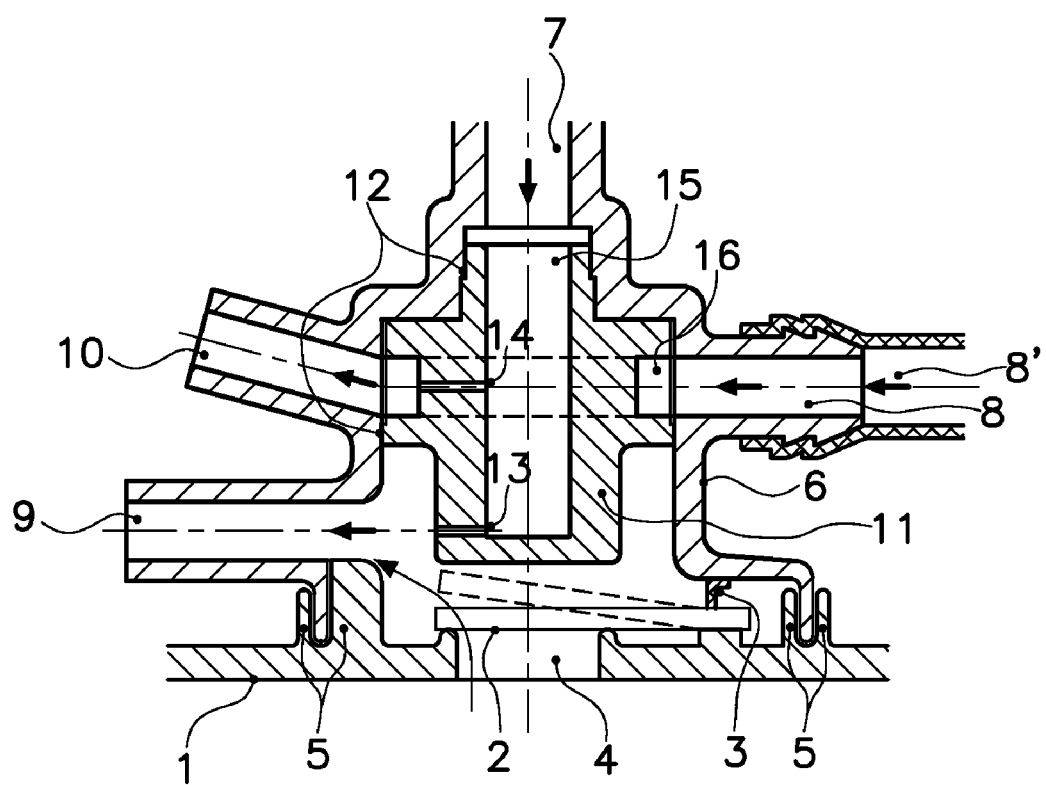

The present invention is illustrated in a non restrictive way be FIGS. 1 and 2 enclosed, which show several preferred embodiments of it, namely:

Part of the bottom (1) of a reservoir intended to be located inside a fuel tank (not illustrated). This bottom (1) is provided with a first fill valve as described above and comprising a disk (2) fitted on a post (3) and cooperating with a hole (4) through the reservoir's bottom (1) which is positioned close to the post (3) and in a way such that the disk (2) covers it when positioned in its relief position (in plain lines) and uncovers it when allowing fuel to enter (in dotted lines), for instance when the fuel level outside the reservoir is higher than inside of it or when the jet pump is functioning.

The bottom of the reservoir around this valve is provided with portions in relief (5) allowing a "T" connector (6) to be plugged in. This "T" connector (6) has 2 fuel inlets built as mixing tubes: one (7) for pressurized fuel coming from the pump (not shown) and one (8) for fuel coming from another chamber of the reservoir than the one where the reservoir is located (and which constitutes the main chamber). The latter is provided through a quick connection with a mere line (8') extending to send chamber. Connector (6) also comprises 2 fuel exits built as mixing tubes and which both lead fuel inside the reservoir: one (9) close to the first fill valve and located close to the bottom of the reservoir (1); and one (10) a little higher, close to the inlet of fuel (8) from the secondary chamber.

Inside the "T" connector (6), a single piece molded dual jet pump (11) is plugged in using press fit areas/connections (12). This piece (11) integrates 2 jet pump orifices: one (13) for sucking fuel from the main chamber outside the reservoir through the first fill valve, and one (14) for sucking fuel from the auxiliary chamber of the reservoir. These orifices are located respectively in front of the lower connector outlet (9) and in front of the higher connector outlet (10). This piece (11 also has 2 fuel inlets (15, 16) in line with the inlets (7, 8) of the connector (6).

When the fuel pump is functioning, pressurized fuel enters the connector (6) through its inlet (7) and by doing so, powers the jets pumps (13, 14) allowing fuel to be sucked from the main chamber through the first fill valve, and from the secondary chamber, through line (8') extending to it.

FIG. 2 shows a system identical to the one of FIG. 1 except that outlet tube (10) has been angled in order to provide a small pool area to retain fuel in order to enable the system to be initiated.

The invention claimed is:

1. A jet pump system, comprising:
a single piece dual jet pump;
two suction openings; and
two delivery openings, said single piece dual pump including
at least one pressurized fluid inlet orifice, and
two separate outlet orifices which are built as two separate jet pumps,
wherein the system is configured such that one of said two separate jet pumps operates to pump fluid from one of said two suction openings to one of said two delivery openings, and the other of said two separate jet pumps operates to pump fluid from the other of said two suction openings to the other of said two delivery openings.

2. A fuel system for an internal combustion engine including a fuel tank, a reservoir within said tank and a pump for supplying the engine with fuel drawn from the reservoir, said fuel system comprising the jet pump system according to claim 1 designed to allow the filling of the reservoir with fuel from at least two different locations in said tank outside the reservoir.

3. The fuel system according to claim 2, wherein the locations are two different chambers in the tank, one being a main chamber where the reservoir and the pump are located, and the other being an auxiliary chamber from which fuel must be drawn.

4. The fuel system according to claim 3, wherein one of the suction openings is in fluid communication with the reservoir via a first fill valve.

5. The fuel system according to claim 3, wherein one of the suction openings is in fluid communication with a line extending from the auxiliary chamber and which enters the single piece dual jet pump through a second fluid inlet.

6. The fuel system according to claim 2, wherein the pressurized fuel entering and powering the dual jet pump is fuel coming directly from the fuel supply pump.

7. The fuel system according to claim 6, wherein the single piece dual jet pump is plugged in a connector having the shape of a "T" which directly connects the fuel supply pump, the fuel filter and the single piece dual jet pump.

8. The fuel system according to claim 7, wherein the connector has a first fluid inlet coming from the fuel supply pump located in front of and in continuation with the pressurized fluid inlet orifice of the single piece dual jet pump; and a second fluid inlet located in front of and in continuation with a second fluid inlet of the single piece dual jet pump.

9. The fuel system according to claim 7, wherein the connector is open at its bottom and comprises additionally two fluid outlets leading inside the fuel reservoir and being located in front of the jet pump outlet orifices.

10. A plastic molded connector suitable for directly connecting a fuel supply pump, a fuel filter and the jet pump system according to claim 1, said connector being open at its bottom and comprising:

a first fluid inlet mixing tube located in front of and in continuation with the pressurized fluid inlet orifice of the single piece dual jet pump;
a second fluid inlet mixing tube located in front of and in continuation with a second fluid inlet of the single piece dual jet pump; and
two fluid outlet mixing tubes being located in front of the jet pump outlet orifices.

11. A jet pump system, comprising:
a single piece dual jet pump;
a first suction opening;
a second suction opening;
a first delivery opening; and
a second delivery opening, said single piece dual pump including
at least one pressurized fluid inlet orifice, and
two separate jet pumps,
wherein the system is configured such that one of said two separate jet pumps operates to pump fluid from the first suction opening to the first delivery opening, and the other one of said two separate jet pumps operates to pump fluid from the second suction opening to the second delivery opening.

12. A fuel system for an internal combustion engine including a fuel tank, a reservoir within said tank and a pump for supplying the engine with fuel drawn from the reservoir, said fuel system comprising the single piece dual jet pump according to claim 11 designed to allow the filling of the reservoir with fuel from at least two different locations in said tank outside the reservoir.

13. The fuel system according to claim 12, wherein the locations are two different chambers in the tank, one being a main chamber where the reservoir and the pump are located, and the other being an auxiliary chamber from which fuel must be drawn.

14. The fuel system according to claim 13, wherein the first suction opening is in fluid communication with the reservoir via a first fill valve.

15. The fuel system according to claim 13, wherein the second suction opening is in fluid communication with a line extending from the auxiliary chamber and which enters the single piece dual jet pump through a second fluid inlet.

16. The fuel system according to claim 12, wherein the pressurized fuel entering and powering the dual jet pump is fuel coming directly from the fuel supply pump.

17. The fuel system according to claim 16, wherein the single piece dual jet pump is plugged in a connector having the shape of a "T" which directly connects the fuel supply pump, the fuel filter and the single piece dual jet pump.

18. The fuel system according to claim 17, wherein the connector has a first fluid inlet coming from the fuel supply pump located in front of and in continuation with the pressurized fluid inlet orifice of the single piece dual jet pump; and a second fluid inlet located in front of and in continuation with a second fluid inlet of the single piece dual jet pump.

19. The fuel system according to claim 17, wherein the connector is open at its bottom and comprises additionally two fluid outlets leading inside the fuel reservoir and being located in front of the jet pump outlet orifices.

* * * * *